United States Patent

Story

[11] Patent Number: 5,118,228
[45] Date of Patent: Jun. 2, 1992

[54] TUBING CUTTER AND COPING APPARATUS

[76] Inventor: Marvin L. Story, 619 N. 75th Cir., Kansas City, Kans. 66112

[21] Appl. No.: 622,656

[22] Filed: Dec. 5, 1990

[51] Int. Cl.⁵ .................. B23B 47/28; B23B 41/00
[52] U.S. Cl. ........................... 408/107; 408/115 R; 408/236
[58] Field of Search ................ 408/72 R, 115 R, 236, 408/712, 107, 100; 83/581, 54

[56] References Cited

U.S. PATENT DOCUMENTS

| | | | |
|---|---|---|---|
| 2,909,083 | 10/1959 | Chestnut | 408/236 |
| 3,263,544 | 8/1966 | Margolien | 83/581 X |
| 3,380,200 | 4/1968 | Kirwin | 51/124 |
| 3,626,513 | 12/1971 | Pytlak | 408/115 |
| 3,703,055 | 11/1972 | Niquet | 51/219 R |
| 3,806,691 | 4/1974 | Roach | 408/236 X |
| 3,890,058 | 6/1975 | Self et al. | 408/712 X |
| 4,152,090 | 5/1979 | Harris et al. | 408/115 R X |
| 4,607,463 | 8/1986 | Slinsky | 51/219 R |
| 4,658,549 | 4/1987 | Lockwood | 51/94 R |
| 4,669,926 | 6/1987 | Wilcox, Jr. | 408/107 X |
| 4,842,453 | 6/1989 | Raines et al. | 408/115 R X |
| 4,936,720 | 6/1990 | Dolatowski et al. | 408/712 X |

Primary Examiner—Frank T. Yost
Assistant Examiner—Rinaldi Rada
Attorney, Agent, or Firm—Henderson & Sturm

[57] ABSTRACT

A tubing cutter and coping apparatus (10) for simultaneously cutting a tube (100) with a selected radius coping which is aligned at a preselected angular orientation relative to the longitudinal axis of the tube (100).

2 Claims, 1 Drawing Sheet

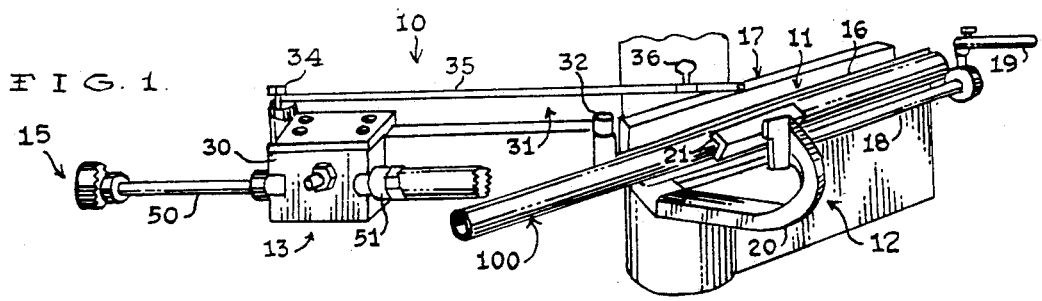
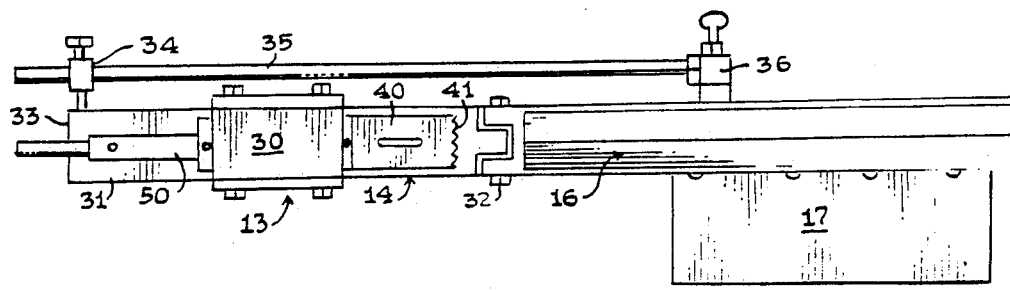
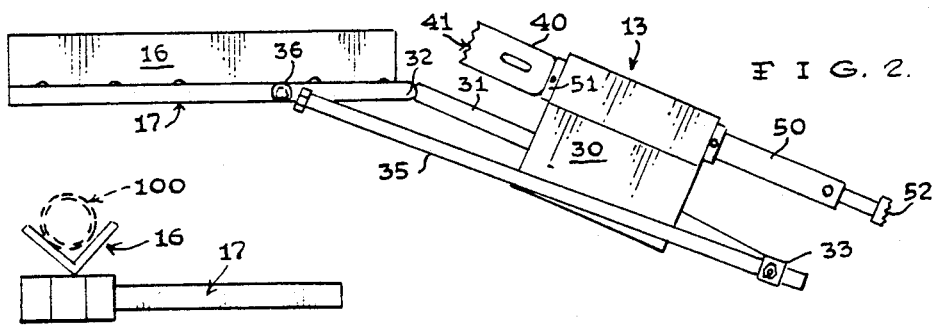
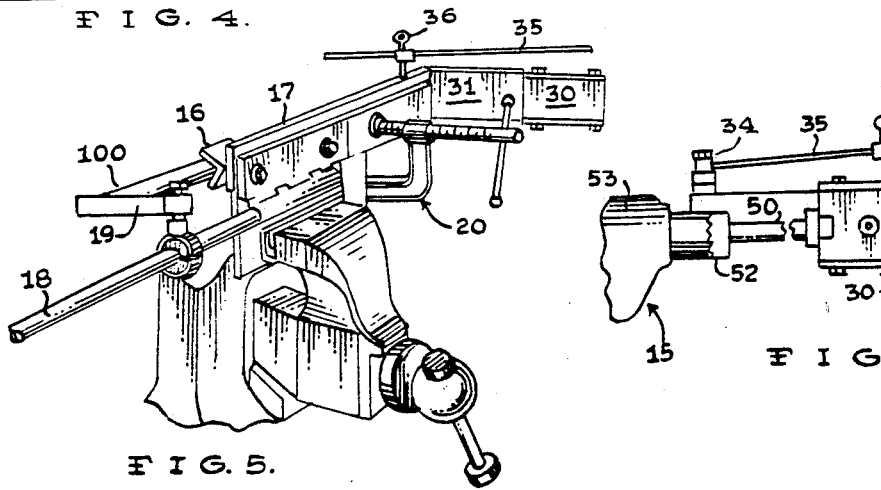

TUBING CUTTER AND COPING APPARATUS

BACKGROUND ART

This invention was the subject matter of Document Disclosure Program Registration No. 250,524 which was filed in the United States Patent and Trademark Office on Apr. 16, 1990.

As can be seen by reference to the following U.S. Pat. Nos. 4,658,549; 4,607,463; 3,380,200; and 3,703,055; the prior art is replete with myriad and diverse precision angle sharpening apparatus.

While all of the aforementioned prior art constructions are more than adequate for the basic purpose and function for which they have been specifically designed, these devices are neither designed nor suited to accomplish the role assigned to the apparatus that forms the basis of the present invention.

In the aircraft industry and other specialized fields it is necessary to first cut and then cope tubing to construct angled tubular frameworks. However up until the present time the cutting and coping functions had been accomplished with hand tools in a sequential fashion.

As a consequence of the foregoing situation, there has existed a longstanding need particularly in the aircraft industry for an apparatus that could simultaneously cut and cope a tubular section of steel pipe at a precise preselected angle and with a predetermined cope size; and, the provision of such a construction is a stated objective of the present invention.

DISCLOSURE OF THE INVENTION

Briefly stated, the tubing cutter and coping apparatus that forms the basis of the present invention comprises a pipe support unit; a pipe clamp unit; an articulated cutter head carriage unit, a cutter head unit; and a drive unit.

In practice a length of steel tubing will be confined within the pipe support unit by the pipe clamp unit. Then the articulated cutter head unit will be aligned to intersect the midpoint of the steel tubing at a desired angle.

At this point a cutter head unit having the desired coping radius is operatively attached to the cutter head carriage unit; and, the articulated carriage unit and cutter head unit are disposed at a selected angular orientation relative to the steel tubing. Then the drive unit is operatively engaged with the cutter head carriage unit, to bring the cutter head unit into severing engagement with the periphery of the steel tubing.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a front perspective view of the apparatus that forms the basis of the present invention;

FIG. 2 is a top plan view of the apparatus;

FIG. 3 is a front plan view of the apparatus;

FIG. 4 is an isolated end view of the pipe support unit;

FIG. 5 is a rear perspective view of the apparatus; and,

FIG. 6 is a detailed view of the operative engagement between the drive unit, the carriage unit; and the cutter head unit.

BEST MODE FOR CARRYING OUT THE INVENTION

As can be seen by reference to the drawings, and in particular to FIG. 1, the tubing cutter and coping apparatus that forms the basis of the present invention is designated generally by the reference numeral (10). The apparatus (10) comprises in general a pipe support unit (11); a pipe clamp unit (12); an articulated cutter head carriage unit (13); a cutter head unit (14); and, a drive unit (15). These units will now be described in seriatim fashion.

As shown in FIGS. 1 through 5, the pipe support unit (11) comprises a generally elongated V-shaped bracket member (16) disposed generally horizontally on a vertical support element (17); wherein, the vertical element is operatively provided with an elongated extension element (18) having a stop element (19) disposed thereon.

As can be seen particularly by reference to FIGS. 1 and 5, the stop element (19) is slideably disposed on the elongated extension element (18) so as to engage the inboard end of the length of steel tubing (100) for reasons that will be explained further on in the specification.

Turning now to FIGS. 1,5 and 6 it can be seen that the pipe clamp unit (12) comprises a generally C-shaped clamp member (20) having a generally V-shaped clamp head (21) dimensioned to frictionally engage the steel tubing (100) against the V-shaped bracket member (16) of the pipe support unit (11).

As can best be seen by reference to FIGS. 1 through 3, the articulated cutter head carriage unit (13) comprises a carriage housing member (30) slideably suspended on an elongated support arm (31) which is pivotally secured on its inboard end (32). In addition the outboard end (33) of the support arm (31) is provided with a pivoted coupling (34) operatively connected to one end of an elongated adjustment element (35) having a slidable releasable locking means (36) disposed on the other end.

As can best be appreciated by reference to FIGS. 2 and 3, when it is desired to dispose the cutter head carriage unit (13) at a particular angular orientation relative to the axis of the steel tubing (100); the carriage unit (13) is pivoted by the support arm (31) and the releasable locking means (36) is laterally translated relative to the elongated adjustment element (17), to fixedly secure the carriage unit (13) in the desired angular orientation.

Still referring to FIGS. 2 and 3, it can be seen that the cutter head unit (14) comprises a generally hollow cylindrical cutter head member (40) provided with a plurality of cutting teeth (41) disposed on its outboard end; wherein, the cutter head member (40) is operatively connected to the cutter head carriage unit (13) and the drive unit (15) as will be explained presently.

As shown in FIGS. 1, 2 and 6, the drive unit (15) comprises an elongated drive shaft (50) operatively associated with the carriage housing (30) and having a cutter head bearing member (51) disposed on its outboard end; and, a drive coupling (52) disposed on its inboard end.

Furthermore the cutter head bearing member (51) is adapted to releasably receive the cutter head member (40); and, the drive coupling (52) is adapted to be connected to a powered drive member (53) such as a power drill or the like, for imparting rotary movement to the cutter head member (40).

Now when it is desired to cut and cope a length of steel tube (100) all that is necessary is to captively engage the tube (100) between the pipe support unit (11) and the pipe clamp unit (12). Then the stop element (19) is butted against the inboard end of the tube (100) and fixedly secured to the elongated exterior element (18) to prevent the tube (100) from being axially displaced.

At this point the carriage unit (13) is aligned at the desired angular orientation relative to the axis of the tube; and, a cutter head member (40) having the desired coping radius is attached to the cutter head coupling member (51). Then the powered drive member (53) is engaged with the drive shaft (50) and the carriage unit (13) is moved along the support arm (31) to bring the cutter head member (40) into severing engagement with the periphery of the steel tube.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A tubing cutter and coping apparatus for simultaneously cutting and coping a tube with a desired coping radius; wherein, the apparatus comprises:

a pipe support unit and a pipe clamp unit for immobilizing said tube;

an articulated cutter head carriage unit comprising a support arm pivotally secured to said pipe support unit and a carriage housing member slideably disposed on said support arm; wherein, said support arm may be pivoted in a horizontal plane to a desired angular orientation relative to said tube; wherein, said carriage unit further comprises an adjustment element operatively connected on one end to said carriage housing member and adapted to releasably engage a portion of the pipe support unit; and, a releasable locking means operatively associated with the adjustment element for immobilizing the housing carriage member at a desired angular orientation relative to said tube; wherein, said adjustment element is pivotally secured on said housing member and said releasable locking means is slideably disposed on said adjustment element;

a cutter head unit including a generally hollow cylindrical cutter head member operatively associated with said carriage housing member wherein the outside diameter of the cutter head member has the same diameter as the outside diameter of said tube; and, a drive unit operatively associated with said cutter head unit for imparting rotary movement to said cutter head member such that angled coping cuts can be made at a desired angle relative to the longitudinal axis of said pipe.

2. The apparatus as in claim 1; wherein, said pipe support unit is further provided with;

an extension element; and, a stop element movably associated in both the horizontal and vertical planes with said extension element; wherein, said stop element is adapted to engage one end of said tube and to be releasably secured to said extension element.

* * * * *